(No Model.)

N. R. BAKER.
THILL COUPLING.

No. 294,107.  Patented Feb. 26, 1884.

Witnesses.
William Cooley
Arthur W. T. Back

Inventor.
Nelson R. Baker
Scovill & DeWitt, Atty's

UNITED STATES PATENT OFFICE.

NELSON R. BAKER, OF GREENE, NEW YORK.

THILL-COUPLING.

SPECIFICATION forming part of Letters Patent No. 294,107, dated February 26, 1884.

Application filed January 7, 1884. (No model.)

*To all whom it may concern:*

Be it known that I, NELSON R. BAKER, a citizen of the town of Greene, in the county of Chenango and State of New York, have invented certain new and useful improvements in fastenings for thills and poles attached to clip-fastenings on buggies, wagons, and other vehicles, cutter-sleighs, mowing-machines, and for all uses where bolts are used in connection with clip-fastenings to vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Similar letters refer to similar parts throughout the several views.

Figure 3:
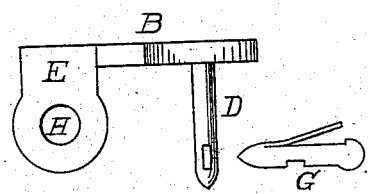
Figure 2:
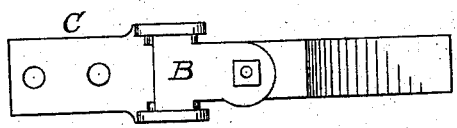
Figure 1:
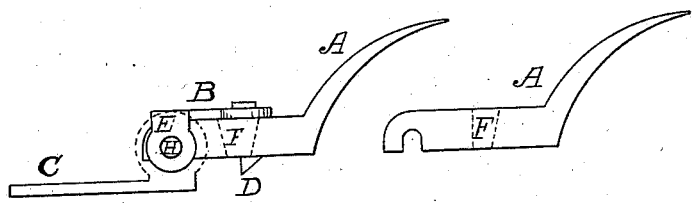

Figure 1 is a side view of my improvement, and Fig. 2 is a top view, and Fig. 3 is a view showing ear and pin for fastening.

A is the thill or pole iron, made of iron or other metal. B is the hinge or clasp, constructed in one part, with bolt D, or spring, in place of bolt, attached. The ears E form a part of the thill or pole iron. The ears E are pierced by bolt H, which passes through the ears in thill or pole iron and the ears in clip C. The hinge or clasp B has a bolt or spring, D, which passes through the slot F in the iron attached to thills or pole, and the bolt D, with a key, G, or spring or clutch attached to iron B in place of the bolt, forms a fastening or holding iron, A, firm to hinge B, as shown in Fig. 1.

The improvement is designed to avoid removing the bolt H in attaching or removing thills or poles from vehicles, which by the improvement may be done by lifting hinge or clasp B, which turns back far enough to permit the iron A to be raised off of the bolt H. It is designed to prevent the thills or poles from rattling and to avoid packing. The improvement may be attached to the thills or poles of ordinary vehicles, mowing-machines, and wherever it is desired to hold the attachment A firm to the bolt H, and to make attachment and removal from bolt H easy and quick.

What I claim is—

The combination of the iron A, attached to the thill or pole, with hinge B, forming the fastening, including bolt, spring, or clutch D, as shown in Fig. 1 and as set forth in the description.

In testimony whereof I have affixed my signature in presence of two witnesses.

NELSON R. BAKER.

Witnesses:
 WILLIAM COOLEY,
 ARTHUR W. T. BACK.